US007245875B2

(12) United States Patent
Clark et al.

(10) Patent No.: US 7,245,875 B2
(45) Date of Patent: Jul. 17, 2007

(54) SYSTEM AND METHOD TO FACILITATE WIRELESS COMMUNICATION IN A WELDING ENVIRONMENT

(75) Inventors: Keith Clark, Concord, OH (US); George Daryl Blankenship, Chardon, OH (US); Christopher Hsu, Mentor, OH (US); Thomas Matthews, Chesterland, OH (US); James Zucker, Northfield Center, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 757 days.

(21) Appl. No.: 09/841,314

(22) Filed: Apr. 24, 2001

(65) Prior Publication Data

US 2002/0168937 A1 Nov. 14, 2002

(51) Int. Cl.
*H04B 7/00* (2006.01)
(52) U.S. Cl. .................................. 455/41.1; 455/426.1
(58) Field of Classification Search ............... 455/41.1, 455/41.2, 41.3, 39, 426.1, 426.2; 370/278, 370/282, 343, 352, 389, 394, 338, 465, 480; 219/130.01, 130.05, 130.21, 125.1, 132, 219/137 R; 700/3, 9, 35, 108, 117, 121, 700/145, 162, 169
See application file for complete search history.

(56) References Cited

U.S. PATENT DOCUMENTS

| 5,808,885 | A | 9/1998 | Dew et al. |
| 5,850,066 | A | 12/1998 | Dew et al. |
| 5,859,847 | A | 1/1999 | Dew et al. |
| 5,981,905 | A | 11/1999 | Ohmi et al. ............ 219/130.01 |
| 6,002,104 | A | 12/1999 | Hsu |
| 6,018,729 | A | 1/2000 | Zacharia et al. |
| 6,040,555 | A | 3/2000 | Tiller et al. |
| 6,087,627 | A | 7/2000 | Kramer |
| 6,479,792 | B1 * | 11/2002 | Beiermann et al. ...... 219/130.5 |
| 6,583,386 | B1 * | 6/2003 | Ivkovich ................. 219/130.01 |
| 6,600,726 | B1 * | 7/2003 | Nevo et al. ................. 370/278 |
| 6,624,388 | B1 * | 9/2003 | Blankenship et al. .... 219/130.5 |
| 2002/0032495 | A1 | 3/2002 | Ozaki ......................... 700/108 |

OTHER PUBLICATIONS

Bluetooth Protocol Architecture. *Signal Newsletter*. http//www.bluetooth.com/news/signal/1999/3_19.asp. Last viewed Apr. 12, 2001. pp. 1-4.
Connex RF PKLR. *Aerocomm*. http//www.aerocomm.com/oem_products/oem_pklr.htm. Last viewed Jan. 26, 2001. pp. 1-3.
International Search Report dated Apr. 10, 2002 for Application No. PCT/US02/11018.

* cited by examiner

*Primary Examiner*—George Eng
*Assistant Examiner*—Sam Bhattacharya
(74) *Attorney, Agent, or Firm*—Amin, Turocy & Calvin, LLP (57) ABSTRACT

A system and method for wireless communication with and among nodes of a welding cell are provided. The system includes a communications device adapted for wireless communication with a welding node provided with a wireless communications interface. The system further includes welding nodes of one welding cell communicating wirelessly with welding nodes of the same welding cell, welding nodes of another welding cell, a customer specific LAN and global factory controls. The invention further comprises methodologies for facilitating wireless communication with and among nodes of a welding cell.

15 Claims, 10 Drawing Sheets

SYSTEM AND METHOD TO FACILITATE WIRELESS COMMUNICATION IN A WELDING ENVIRONMENT

TECHNICAL FIELD

The present invention relates generally to computer and welding systems, and more particularly to a system and method of wireless communication with and among nodes of a welding cell.

BACKGROUND OF THE INVENTION

Welding systems reside at the core of the modem industrial age. From massive automobile assembly operations to automated manufacturing environments, these systems facilitate joining in ever more complicated manufacturing operations. One such example of a welding system includes an electric arc welding system. This may involve movement of a consumable electrode, for example, toward a work piece while current is passed through the electrode and across an arc developed between the electrode and the work piece. The electrode may be a non-consumable or consumable type, wherein portions of the electrode may be melted and deposited on the work piece. Often, hundreds or perhaps thousands of welders are employed to drive multiple aspects of an assembly process, wherein sophisticated controllers enable individual welders to operate within relevant portions of the process. For example, some of these aspects relate to control of power and waveforms supplied to the electrode, movements or travel of a welding tip during welding, electrode travel to other welding points, gas control to protect a molten weld pool from oxidation at elevated temperatures and provide ionized plasma for an arc, and other aspects such as arc stability to control the quality of the weld. These systems are often deployed over great distances in larger manufacturing environments and many times are spread across multiple manufacturing centers. Given the nature and requirements of modern and more complex manufacturing operations, however, welding systems designers, architects and suppliers face increasing challenges in regard to upgrading, maintaining, controlling, servicing and supplying various welding locations. Unfortunately, many conventional welding systems operate in individually controlled and somewhat isolated manufacturing locations in regard to the overall assembly process. Thus, controlling, maintaining, servicing and supplying multiple and isolated locations in large centers and/or across the globe has become more challenging, time consuming and expensive.

One such challenge relates to coordinating, controlling and configuring nodes of a welding cell. Conventional systems often require engineers and designers to travel to a plurality of different nodes of a welding cell to manually change and/or modify a current production process. This can involve modifying the power and waveforms supplied by a power source to an electrode, for example. In an industrial environment, physical access to nodes of a welding cell can be limited and impractical. Further, when the overall assembly operation is finally underway, however, it may be discovered that some individual elements need to be "tuned" or modified. This may involve sending a systems engineer to each physical location to modify individual elements.

This challenge can be magnified when coordinating, controlling and configuring a plurality of welding systems. Conventional systems often require engineers and designers to travel to a plurality of different welding cell locations to manually change and/or modify a current production process. This may involve modifying programs associated with the control aspects of each welder, for example. After modifications have occurred, individual welders may then be tested at each location to verify one particular portion of the overall process. When the overall assembly operation is finally underway, however, it may be discovered that some individual welders need to be "tuned" or modified in order to integrate with other welding systems contributing to the process. This may involve sending a systems engineer to each welding cell location in a large assembly operation to modify an individual portion of the process. The limitations in gaining physical access to the nodes can thus be amplified creating a difficult task for engineers and designers.

Another challenge facing welding systems relates to service and maintenance. Welders are often maintained and serviced according to procedures implemented by operators of the welding systems. Although some operators may adequately service and maintain these systems, quality of the service and maintenance is often up to the training and competence of the individual operator. Thus, a large collection of well-maintained welders servicing an overall assembly process may be at the mercy of another welding system that is not properly serviced or maintained. This may cause the process to stop or be disrupted during service outages relating to a poorly maintained welder. Even under the best of circumstances, however, given that many welding systems are operating in an isolated manner, diagnostic information relating to the health of these systems is often not reported or discovered until after a breakdown occurs.

Still yet another challenge relating to conventional welding systems relates to ordering and supplying consumable items for the systems. As described above, these items may include wire, gas, and other components associated with the welding process. These materials are often tracked and ordered by operators or supervisors responsible for the process.

Due to the problems described above and other problems associated with conventional welding systems, there is an unsolved need for to a system and method of wireless communication with and among nodes of a welding cell.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention relates to a system and method of wireless communication (e.g., short-range) with and among nodes of a weld cell utilizing a frequency adjusting wireless communication protocol (e.g., Bluetooth). The system provides a wireless communications interface with a welding cell node thus facilitating the capability for a device communicating with the welding cell node to have access to the welding cell nodes, other nodes of the same welding cell, as well as remote systems, internal networks and/or to broader networks such as the Internet, for example. These systems may include machinery in a plant production line, supervisory systems, inventory systems, quality control systems and maintenance systems associated with the welders. Communication with these systems facilitates such activities as electronic commerce, distributed control, maintenance, customer support, and order/supply/distribution of welding materials. Thus, the system of the present invention promotes a new generation of intelligent welding systems that improve upon conventional and somewhat isolated welding systems in favor of higher-level integration to achieve improved quality, productivity, and lower cost manufacturing.

In accordance with the present invention, a wireless communication device (e.g., personal data assistant or laptop computer) is adapted for wireless communication with a node of a welding cell (e.g., power source, gas controller, wire drive and gun, water cooler and/or user controls) provided with a wireless communications interface. The wireless communication can be accomplished utilizing one of a plurality of public domain wireless communication standards (e.g., Bluetooth or ConnexRF) or a frequency adjusting wireless communication protocol (e.g., to achieve improved noise immunity, such as frequency hopping spread spectrum and/or direct sequence spread spectrum) to facilitate communication with and among welding cell nodes. A user (e.g., weld engineer or operator) utilizing the wireless communication device can thus be within close proximity (e.g., 10 meters) of the node and communicate information to the node (e.g., parameter settings and load new weld procedures). The user is further able to retrieve information from the node (e.g., wire usage, error logs and diagnostic information). Further, since nodes of a welding cell can communicate via a communications link (e.g., local area network) utilizing a communications protocol, for example Arclink, a user can have wireless communications with each of the nodes of a welding cell connected via the communications link as long as at least one of the nodes is equipped for wireless communication.

In accordance with another aspect of the present invention, nodes of a welding cell (e.g., power sources) can be provided with means for wireless communication with other elements of the same welding cell (e.g., wire drive and gun) and/or elements of other welding cells (e.g., power sources of other welding cells) utilizing a frequency adjusting wireless communication protocol (e.g., Bluetooth). Thus, coordination among elements of a welding cell and/or elements of other welding cells is facilitated. For example, power sources of two welding cells can synchronize their waveforms in order to implement wireless coordination for multi-arc/multi-power supply or power-sharing in parallel power supply system for a single arc.

In accordance with yet another aspect of the present invention, a node of a welding cell can be adapted for wireless communication with a local system (e.g., Programmable Logic Device (PLD), Field-Programmable Gate Array (FPGA) and/or microprocessor based computer) utilizing a frequency adjusting wireless communication protocol (e.g., Bluetooth). The local system can be connected to a customer specific local area network (LAN), for example, Ethernet, thus serving as a gateway for wireless communication between the customer specific LAN and the node. Further, the node can be an element of a communications network of a welding cell communicating via a communications link, a LAN for example, utilizing a communications protocol such as Arclink Weld Communications Standard. Thus, wireless communication between a welding cell and a customer specific LAN is facilitated. Further, nodes of a plurality of welding cells can be adapted for wireless communication with a local server or a customer specific global factory controller.

In accordance with the present invention, nodes of a welding cell can be adapted for wireless communication among themselves thus establishing a wireless local area network. The nodes can communicate via a communications protocol such as Arclink Weld Communications Standard, thus reducing problems associated with cabling in an industrial environment.

The system of the present invention further enables the overall system of welders to be operated, supplied and maintained. Welding resources (e.g., welding manuals or weld procedures) can be retrieved by a user with a wireless communications device in close proximity of a node through wireless communication with the node. The welding resources can be retrieved from the node itself, from other nodes of the same welding cell, from nodes of other welding cells, from a local server or via the Internet. Further, the welding supplies associated with a welding cell can be monitored by wireless communication with a node of a welding cell facilitating sales and order processing/forecasting in relation to consumable/replacement items relating to the welding cell. For example, process items such as weld wire or gas can be monitored and ordered as supplies diminish.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details. In other instances, well-known structures and devices are shown in block diagram form in order to facilitate description of the present invention.

As used in this application, "frequency adjusting wireless communication protocol" is a protocol for wireless communication between at least two entities (e.g., a wireless communications device and a node of a welding cell) employing frequency adjustment, for example, to achieve improved noise immunity. The protocol can include communication via a portion of the radio frequency and a format for transmissions between the entities. An example of a wireless communication protocol is the Bluetooth open global standard for short-range wireless communication. Bluetooth is a Radio Frequency (RF) specification for short-range, point to multi-point voice and data transfers. Bluetooth can transmit through solid, non-metal objects. It has a nominal link range from 10 centimeters to 10 meters, but can be extended to 100 meters by increasing the transmit power. It is based on short-range radio links and facilitates ad hoc connections for stationary and mobile communication environments. The Bluetooth standard is a low cost, short-range wireless communication standard that typically operates in the 2,400–2,483.5 MHz industrial, scientific and medical (ISM) band. The ISM band is available worldwide and allows unlicensed operation of spread spectrum systems. The Bluetooth standard is often employed for short distance connections and can be employed to replace cables used today that, for example, connect laptops to cellular telephones, printers, desktops, fax machines, joysticks and many other digital devices that can be part of the Bluetooth system. Bluetooth can also provide a bridge to existing data networks. Bluetooth is specifically designed to provide low-cost, robust, efficient, high capacity, ad hoc voice and data networking.

Bluetooth technology has been designed to operate in noisy radio frequency environments and uses a fast acknowledgment and frequency hopping scheme to make a robust communications link. Bluetooth radio modules attempt to avoid interference from other signals by hopping to a new frequency after transmitting or receiving a packet as compared to other systems operating at the same frequency band. The implementations of faster hops and shorter packets limit impact of microwave and other sources of interference. Bluetooth uses forward error correction to limit impact of random noise on longer distance links.

The Bluetooth specification employs frequency hopping spread spectrum techniques. The Bluetooth specification further provides a standard method data transmission between Bluetooth devices employing, for example, RFComm, OBEX, Service Discovery Protocol and/or logical link control and adaptation protocol. Another example of a frequency hopping spread spectrum wireless communications protocol is ConnexRF by AeroComm. It is to be appreciated that alternative frequency adjusting wireless communication protocols (e.g., to achieve improved noise immunity) are also encompassed within the present invention (e.g., direct sequence spread spectrum).

"Arclink" refers to digital communication system that conveys information between welding system components such as power sources, wire feeders, robots and other peripheral equipment. Arclink is based on the Controller Area Network (CAN 2.0B) protocol standard. Arclink is an open arc welding protocol.

A "node" of a welding cell refers to a physical hardware component of a welding system including, but not limited to, a wire feeder, contact tip, dresser, gas mixer, gas sneezer, gas controller, clamp actuator, travel carriage/part manipulator, robot arm/beam/torch manipulator, laser seam tracker, other input/output devices and welding power source. "Welding cell" refers to a grouping of physical hardware components (nodes). It is to be appreciated that a node and/or welding cell can comprise a combination of hardware and software or in some cases simply software (e.g., virtual node or welding cell).

Figure 1:
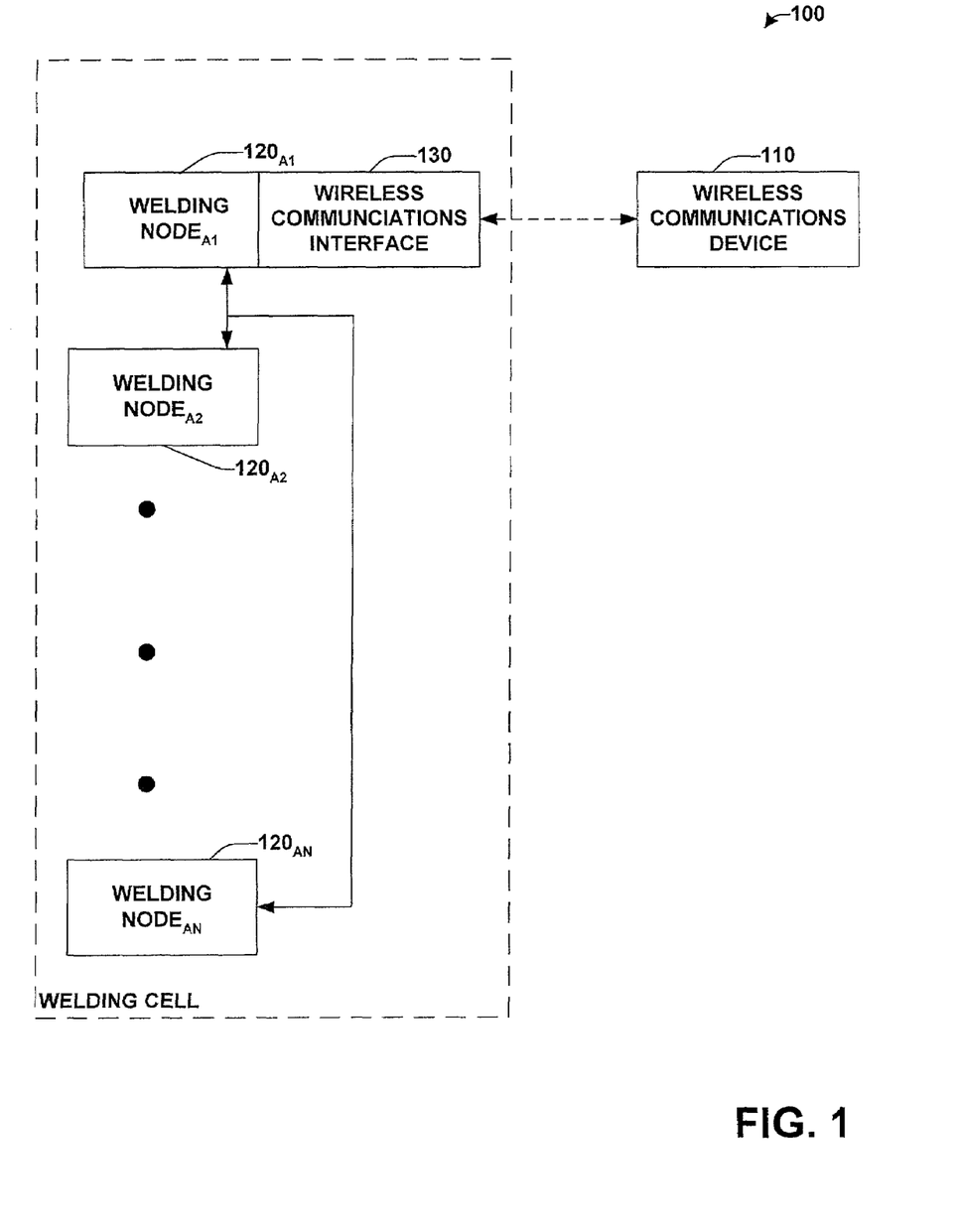
FIG. 1 is a schematic block diagram illustrating a system for wireless communication with a node of a welding cell in accordance with an aspect of the present invention.

Referring to FIG. 1, a system 100 for wireless communication with a node of a welding cell is illustrated. The system includes a wireless communications device 110 and a welding node $120_{A1}$ through an Nth welding node $120_{AN}$, N being an integer greater to or equal to one. The welding nodes $120_1$ through $120_N$ can be referred to collectively as the welding node 120. At least one of the welding node 120 is provided with a wireless communications interface 130. The wireless communications device 110 and the wireless communications interface 130 are adapted for wireless communication utilizing a frequency adjusting wireless communication protocol (e.g., Bluetooth).

For example, a user utilizing the wireless communications device 110 (e.g., a personal digital assistant, such as a Palm Pilot, adapted for wireless communication) can come in close proximity (e.g., within 10 meters) of the welding node 120 (e.g., a power source adapted for wireless communication through a wireless communications interface). Utilizing the wireless communications device 110, the user can retrieve information from the welding node 120 (e.g., diagnostic information or failure records). The user can also send information to the welding node (e.g., parameters). Further, if the welding node 120 is adapted to communicate with other welding nodes via a communications link, for example Arclink Weld Communications Standard, the user can obtain information from the other welding nodes through the welding node provided with the wireless communications interface. This allows a user, for example a weld engineer, to obtain information from a welding cell for troubleshooting purposes or to load a new weld procedure for the cell.

Further, by establishing reliable wireless communications with a welder, cable management problems inherent in the prior art are reduced. For example, cabling requirements for welder(s) on construction sites can significantly be reduced resulting in decreased costs and potentially increased site safety. Additionally, problems associated with cables in the prior art, such as unreliable cable terminations, are greatly reduced.

Figure 2:
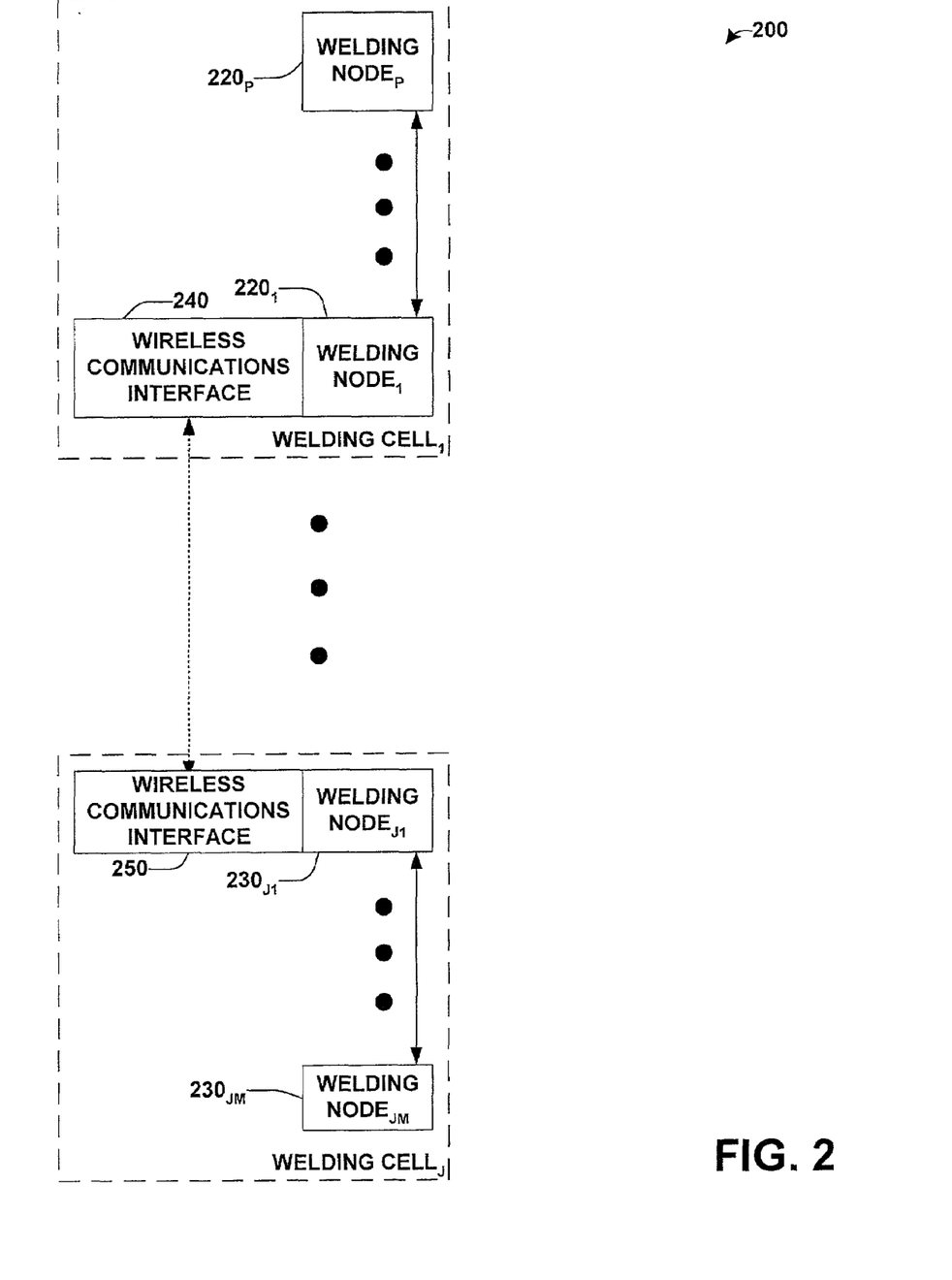
FIG. 2 is a schematic block diagram illustrating a system for wireless communication between nodes of different welding cells in accordance with an aspect of the present invention.

Next, referring to FIG. 2, a system for wireless communication between nodes of different welding cells is illustrated. The system includes a first welding cell$_1$ $210_1$ comprising at least one welding node $220_1$ through a Pth welding node $220_P$, P being an integer greater to or equal to one. The welding nodes $220_1$ through $220_P$ can be referred to collectively as the welding node 220. The system further includes a Jth welding cell $210_J$, J being an integer greater to or equal to two, comprising at least one welding node $230_{J1}$ through an Mth welding node $230_{JM}$, M being an integer greater to or equal to one. The welding nodes $230_{J1}$ through $230_{JM}$ can be referred to collectively as the welding node 230. At least one welding node 220 of welding cell$_1$ 210$_1$ and at least one welding node 230 of welding cell$_J$ 210$_J$ are provided with wireless communications interfaces 240, 250. The wireless communications interfaces 240, 250 are adapted for wireless communication utilizing a frequency adjusting wireless communication protocol (e.g., Bluetooth).

For example, two power sources of tandem MIG welders can be provided with wireless communications interfaces. The MIG welders have two arcs that commonly are required to be synchronized. Communicating via the wireless communications interfaces, the two power sources can synchronize their power and/or waveforms in order to implement wireless power coordination resulting in a reduction in cabling requirements and increased flexibility in the industrial environment (e.g., tandem MIG welders).

Figure 3:
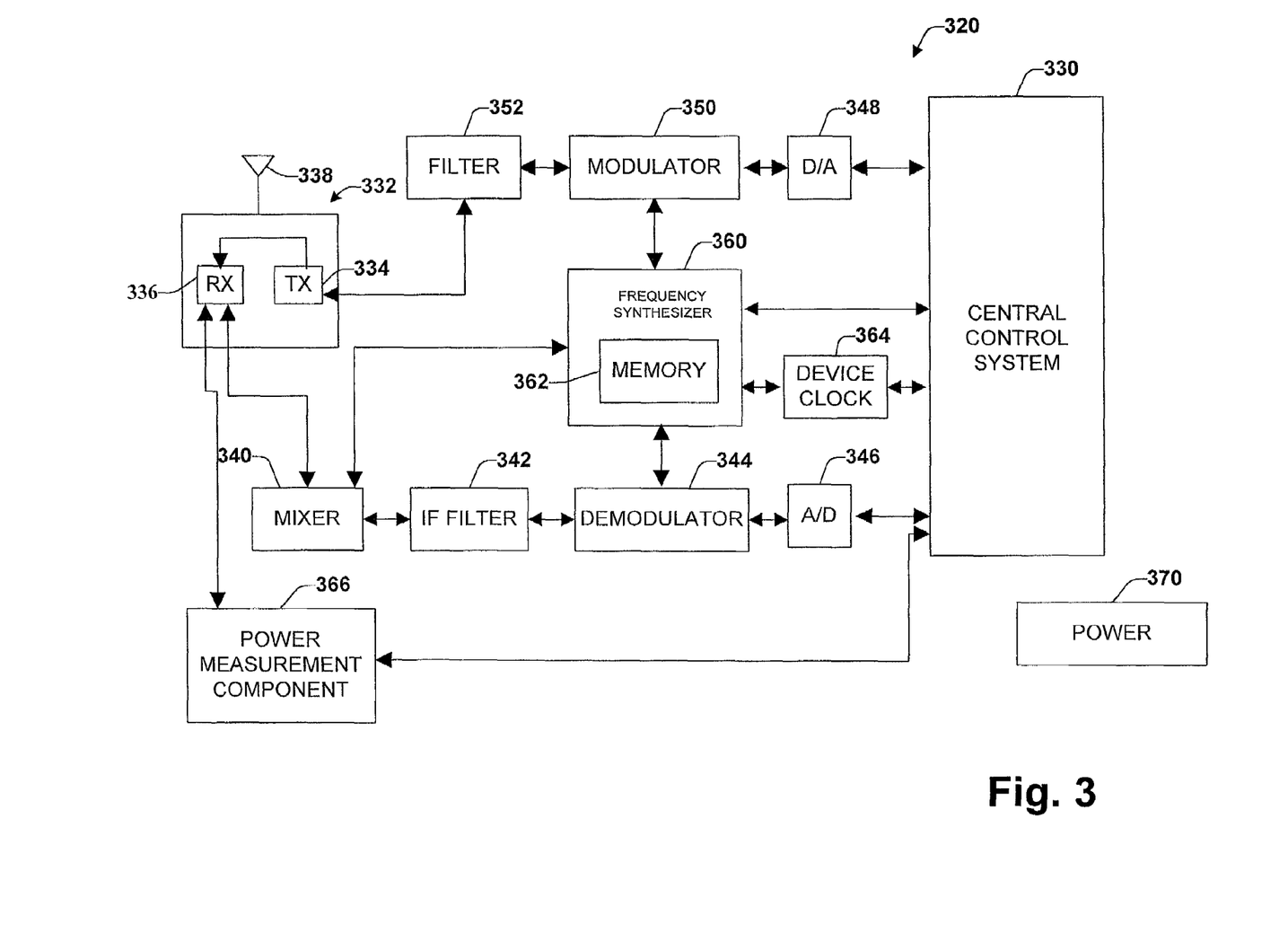
FIG. 3 illustrates a block schematic diagram of a wireless communications device in accordance with the present invention.

FIG. 3 provides a schematic representation of the wireless communications device 110 is shown according to one particular aspect of the present invention, wherein a central control system 330 is responsible for controlling general operations of the wireless communications device 110. The central control system 330 can include a processor or the like that is programmed to control and operate various components within the wireless communications device 110 in order to carry out various functions described herein. The manner in which the processor can be programmed to carry out the functions relating to the present invention will be readily apparent to those having ordinary skill in the art based on the description provided herein.

The wireless communications device 110 includes a transceiver 332 having transmitting circuitry 334 and receiving circuitry 336 that are both coupled to an antenna 338. The receiver 336 receives transmissions through the antenna 338, which is transmitted through a mixer 340, filtered by an intermediate frequency (IF) filter 342 and demodulated by a demodulator 344. The transmission is then digitized through an A/D converter 346 for processing by the central control system 330. Transmissions are transmitted from the central control system 330 through a D/A converter 348 to a modulator 350 and a filter 352 to the transmitter 334 out through the antenna 338. A frequency synthesizer component 360 contains a memory component 362. The frequency synthesizer component 360 cooperates with the central control system 330 and a device clock 364 to provide frequency hopping for the wireless communications device 110. The memory component 362 may include a plurality of register banks for storing synthesizer codes that are employed to facilitate frequency hopping. Alternatively, the register banks may reside in the central control system 330 (e.g., in a memory component, onboard registers or memory in a processor or in separate register components). The frequency synthesizer component 360 is also operatively coupled to the modulator 350, the demodulator 344 and the mixer 340 to provide a frequency oscillation component for transmitting and receiving communications. A measurement power component 366 is operatively coupled to the receiver 334 and provides transmission power measurement information to the central control system 330. Power is provided to the central control system 330 and other components forming the wireless communications device 110 by a power component 370, such as a battery power module, line power or the like, for example.

Figure 4:
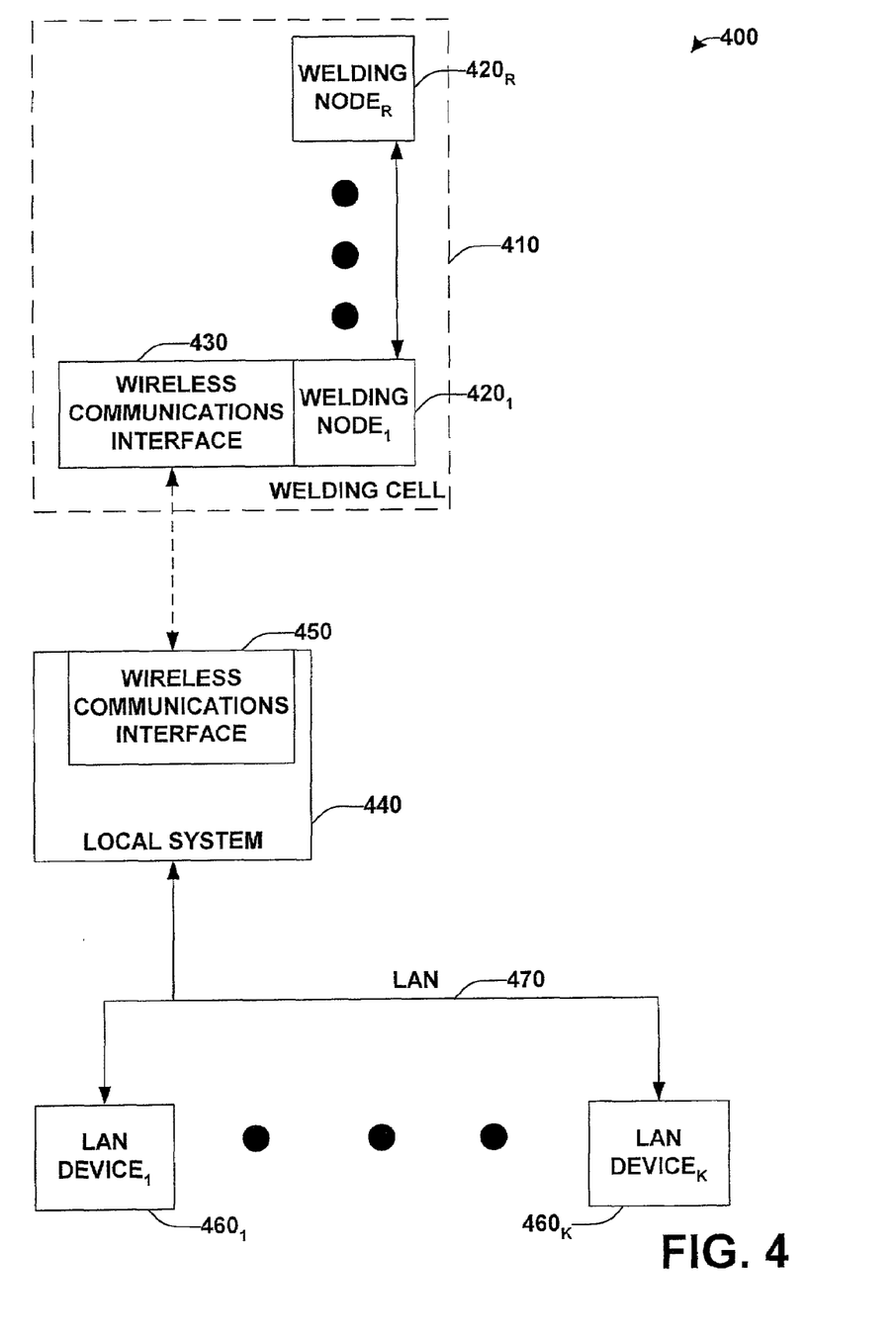
FIG. 4 is a schematic block diagram illustrating a system for a node of a welding cell having wireless communication with a customer specific LAN in accordance with an aspect of the present invention.

Turning now to FIG. 4, a system 400 for a welding node 420$_1$ of a welding cell 410 for wireless communication with a customer specific LAN 470 is illustrated. The system includes a welding cell 410 comprising at least one welding node 420$_1$ through an Rth welding node 420$_R$, R being an integer greater to or equal to one. The welding nodes 420$_1$ through 420$_R$ can be referred to collectively as the welding node 420. At least one welding node 420 of the welding cell 410 is provided with a wireless communications interface 430. The system further includes a local system (e.g., Programmable Logic Device (PLD), Field-Programmable Gate Array (FPGA) and/or microprocessor based computer) 440 provided with a wireless communications interface 450. The wireless communications interfaces 430, 450 are adapted for wireless communication utilizing a frequency adjusting wireless communication protocol (e.g., Bluetooth). The system further includes a LAN 470 which connects the local system 440 to at least one LAN device 460$_1$ through a Kth LAN device 460$_K$, K being an integer greater to or equal to one. The LAN devices 460$_1$ through LAN device 460$_K$ can be referred to collectively as the LAN device 460.

For example, a welding cell 410 consisting of four welding nodes: power source, wire drive and gun, gas controller and user controls, connected via the Arclink Weld Communications Standard network is able to have wireless communication with a customer specific LAN utilizing a wireless communications interface of a local system (e.g., Programmable Logic Device (PLD), Field-Programmable Gate Array (FPGA) and/or microprocessor based computer). This results in decreased cabling in the industrial environment and increased flexibility of the welding cells which can be themselves elements of a larger system of welding cells. Through the LAN, a user in a remote location (e.g., purchasing department) is able to conveniently retrieve information from the welding cell (e.g., wire usage or gas consumption). Further, a user (e.g., weld engineer) utilizing a wireless communications device (e.g., personal digital assistant, such as a Palm Pilot adapted for wireless communication) can stand in close proximity (e.g., 10 meters) of a node of a welding cell having a wireless communications interface and extract information regarding other welding nodes connected to the welding node via a network such as Arclink Weld Communications Standard as well as devices connected to the customer specific LAN. Thus, the welding node having a wireless communications interface can serve as a gateway to the entire factory and even to the Internet if the customer specific LAN provides Internet access.

Figure 5:
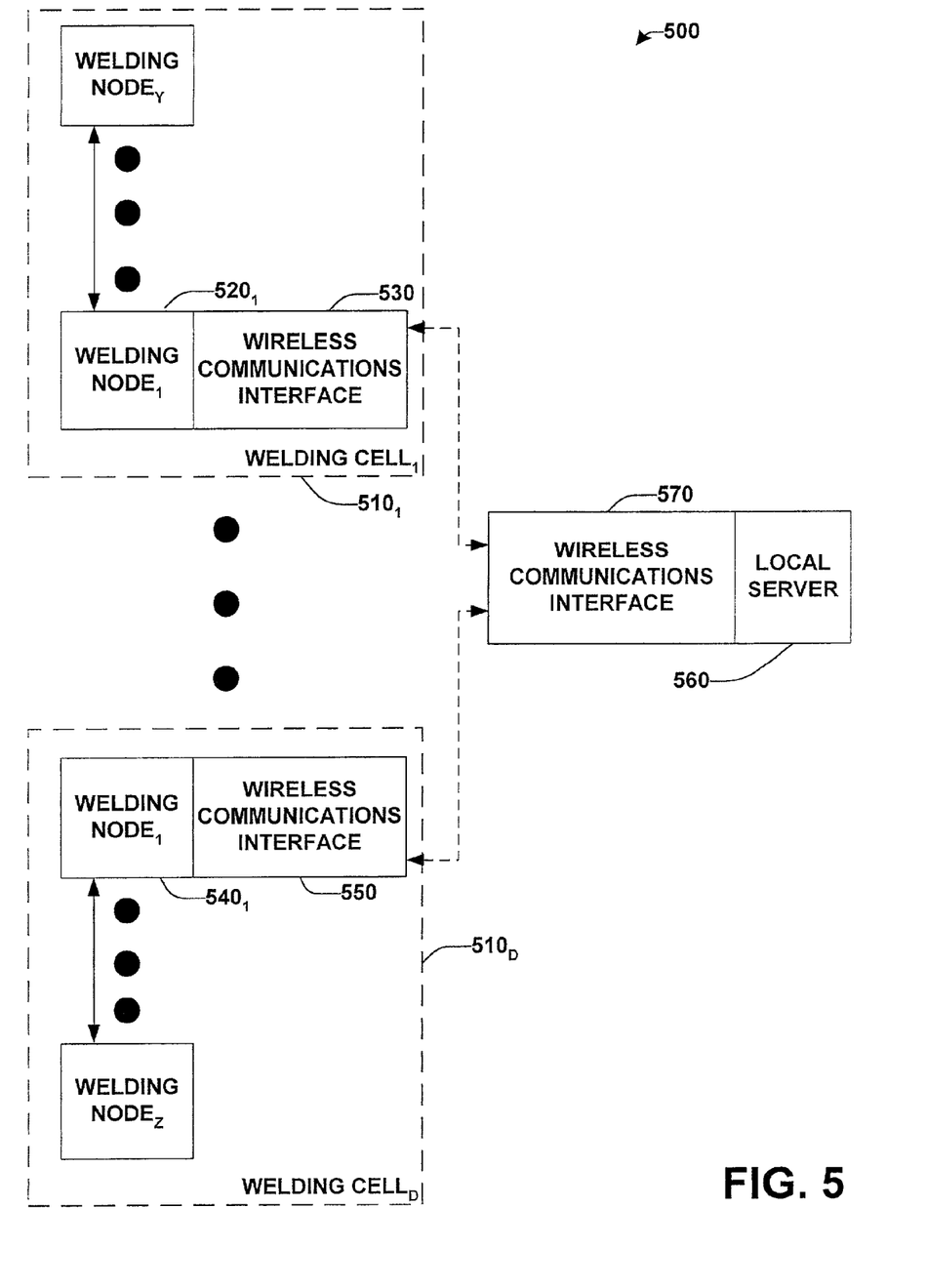
FIG. 5 is a schematic block diagram illustrating a system for nodes of a plurality of welding cells having wireless communication with a local server in accordance with an aspect of the present invention.

Referring to FIG. 5, a system 500 for welding nodes 520, 540 of a welding cell 510 for wireless communication with a local server 560 is illustrated. The system includes at least one welding cell 510$_1$ through a Dth welding cell 510$_D$, D being an integer greater to or equal to one. The welding cells 510$_1$ through 510$_D$ can be referred to collectively as the welding cell 510. At least one welding node 520$_1$, 540$_1$ of the welding cell 510 is provided with a wireless communications interface 530, 550. The system further includes a local server 560 provided with a wireless communications interface 570. The wireless communications interfaces 570, 530, 550 are adapted for wireless communication utilizing a frequency adjusting wireless communication protocol (e.g., Bluetooth).

The local server 560 can serve as a central deposit location for information associated with the welding cell 510. For example, current weld procedures can be available on the local server 560. Wireless coordination of weld procedures for one welding cell or an entire factory can thus be facilitated resulting in a reduction in cabling requirements and increased efficiency.

Figure 6:
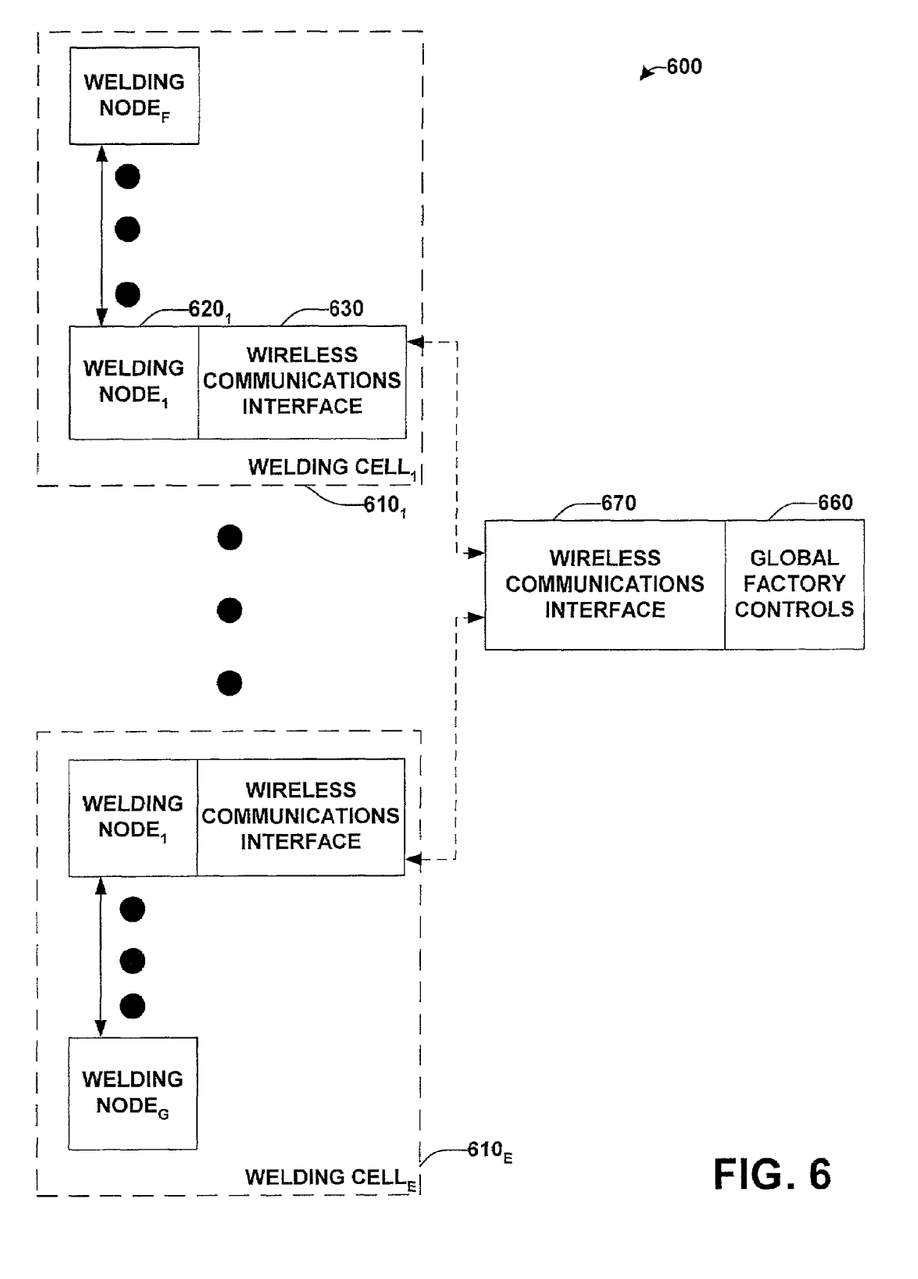
FIG. 6 is a schematic block diagram illustrating a system for nodes of a plurality of welding cells having wireless communication with global factory controls in accordance with an aspect of the present invention.

Referring to FIG. 6, a system 600 for welding nodes 620, 640 of a welding cell 610 for wireless communication with a global factory controls 660 is illustrated. The system includes at least one welding cell $610_1$ through an Eth welding cell $610_E$, E being an integer greater to or equal to one. The welding cells $610_1$ through $610_E$ can be referred to collectively as the welding cell 610. At least one welding node $620_1$, $640_1$ of the welding cell 610 is provided with a wireless communications interface 630, 650. The system further includes a local server 660 provided with a wireless communications interface 670. The wireless communications interfaces 670, 630, 650 are adapted for wireless communication utilizing a frequency adjusting wireless communication protocol (e.g., Bluetooth).

For example, in accordance with the present invention, the global factory controls 660 can serve as a repository of weld procedures for a factory. Specific weld procedures can be loaded into the welding cell 610 in response to a time-based event (e.g., work shift change) or other event (e.g., proximity switch) via wireless communication. Thus, an entire factory assembly line can be automated to weld a specific part at one point in time, and, at a different point in time, to weld a different part. The timing and changing of the weld procedure can be transmitted wireless by the global factory controls 660 to the individual welding cell 610. Further, the global factory controls 660 can retrieve information from the welding cell 610 (e.g., wire usage and error logs) and take action upon the information obtained (e.g., place an order for consumables). The global factory controls 660 can include machinery in a plant production line, supervisory systems, inventory systems, quality control systems and maintenance systems associated with the welders.

Figure 7:
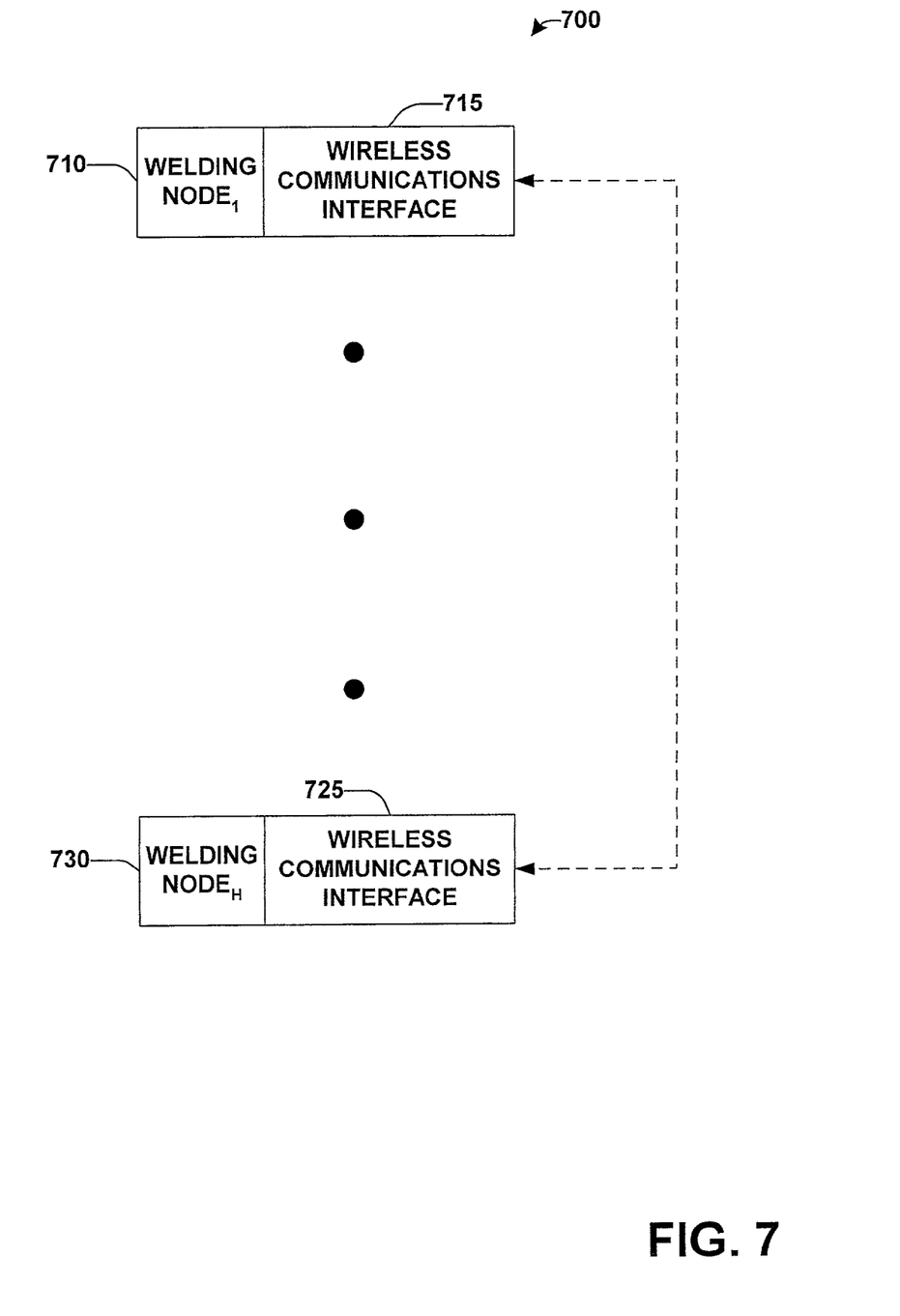
FIG. 7 is a schematic block diagram illustrating a system for nodes of a welding cell having wireless communication in accordance with an aspect of the present invention.

Next, referring to FIG. 7, a system 700 for welding nodes 710, 730 of a welding cell for wireless communication is illustrated. The system includes a first welding node$_1$ 710 through an Hth welding node$_H$ $710_H$, H being an integer greater to or equal to two. The welding nodes 710, 730 are provided with wireless communications interfaces 715, 725. The wireless communications interfaces 715, 725 are adapted for wireless communication utilizing a frequency adjusting wireless communication protocol (e.g., Bluetooth). Thus, a wireless network of welding nodes 710, 730 can be provided resulting in reduced cabling cost and decreased troubleshooting time.

Figure 8:
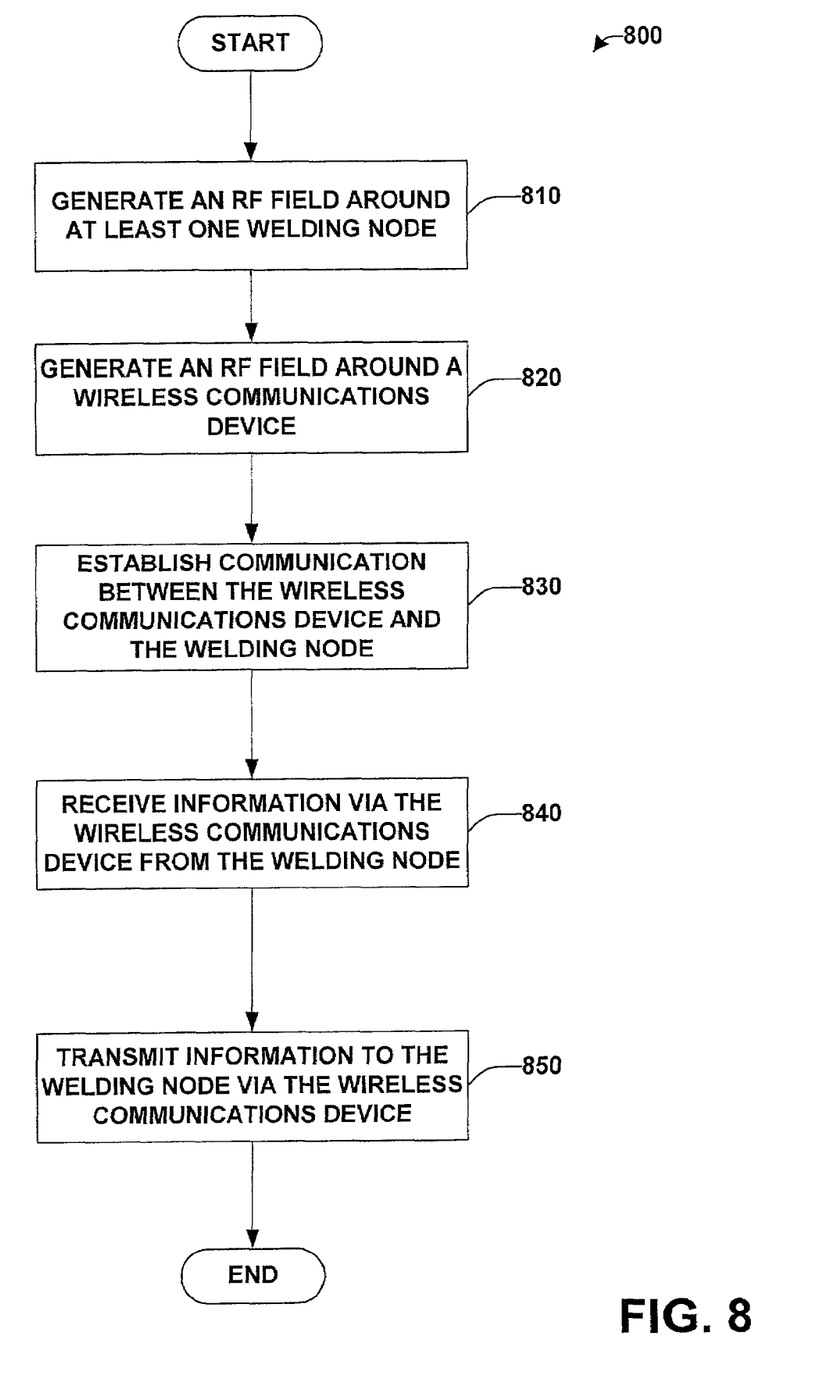
FIG. 8 is a flow chart diagram illustrating a methodology for providing wireless communication in a welding system in accordance with the present invention.
Figure 9:
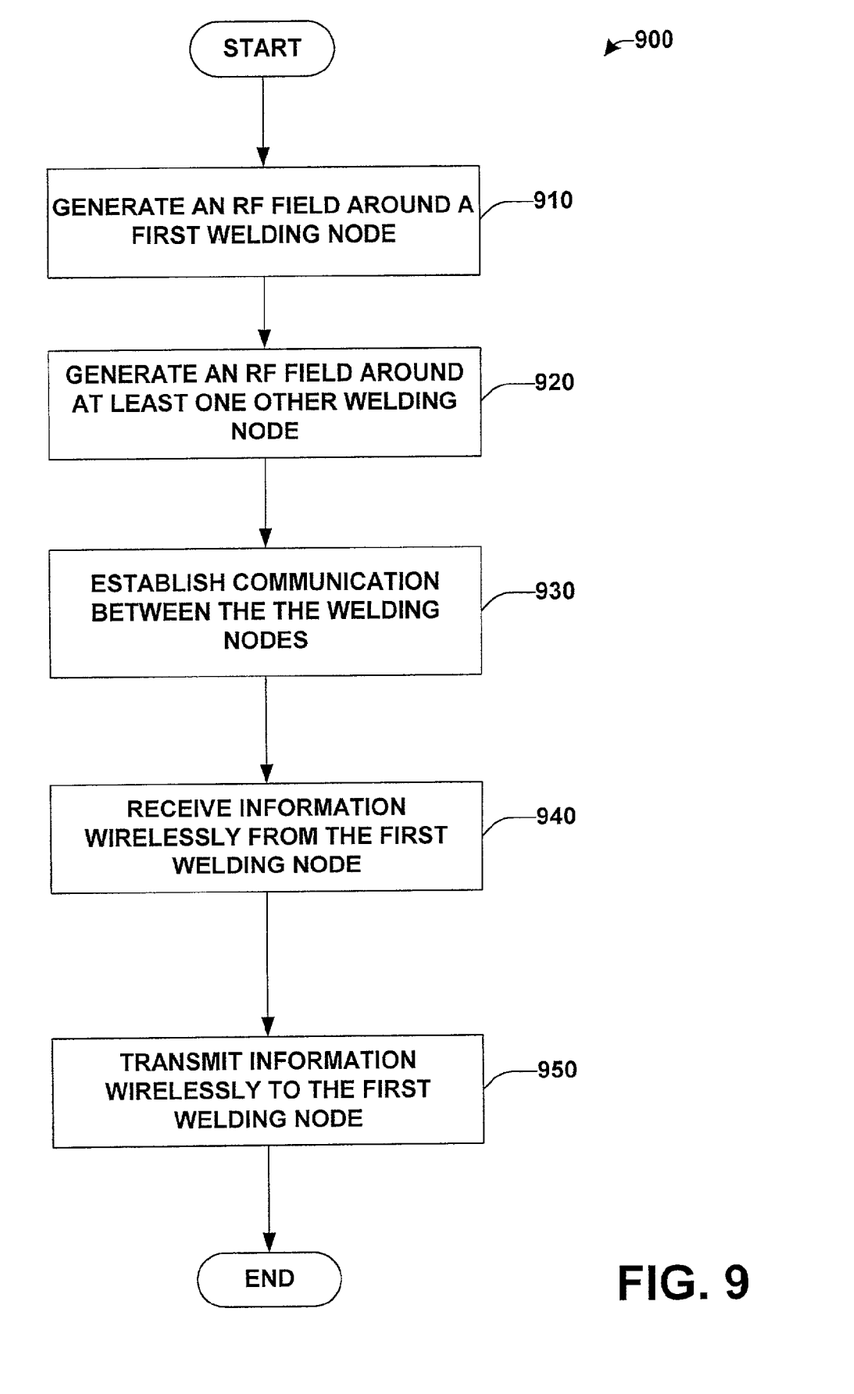
FIG. 9 is a flow chart diagram illustrating a methodology for providing wireless communication in a welding system in accordance with the present invention.

FIGS. 8 and 9 illustrate a methodology for providing various aspects of establishing wireless communications in a welding system in accordance with the present invention. The method comprises a group of actions or processes represented by blocks. While, for purposes of simplicity of explanation, the methodology is shown and described as a series of blocks, it is to be understood and appreciated that the present invention is not limited by the number or order of blocks, as some blocks may, in accordance with the present invention, occur in different orders and/or concurrently with other blocks from that shown and described herein. For example, those skilled in the art will understand and appreciate that a methodology could alternatively be represented as a series of interrelated states, such as in a state diagram. Moreover, not all illustrated acts may be required to implement a methodology in accordance with the present invention.

Turning now to FIG. 8, a methodology for providing wireless communication in a welding system in accordance with the present invention is provided. Beginning at 810, an RF field is generated around at least one welding node. At 820, an RF field is generated around a wireless communications device (e.g., personal digital assistant, such as a Palm Pilot, adapted for wireless communication). At 830, communications are established between the wireless communications device and at least one welding node. At 840, information (e.g., diagnostic information or failure record) is wirelessly received by the wireless communications device from the welding node. At 840, information (e.g., parameters) is transmitted by the wireless communications device to the welding node.

Referring to FIG. 9, a methodology for providing wireless communication in a welding system in accordance with the present invention is provided. Beginning at 910, an RF field is generated around a first welding node. At 920, an RF field is generated around at least one other welding node. At 930, communications are established between the first welding node and at least one other welding node. At 940, the at least one other welding node receives information (e.g, power source) wirelessly from the first welding node. At 950, the at least one other welding node sends information (e.g., waveform) wirelessly to the first welding node.

Figure 10:
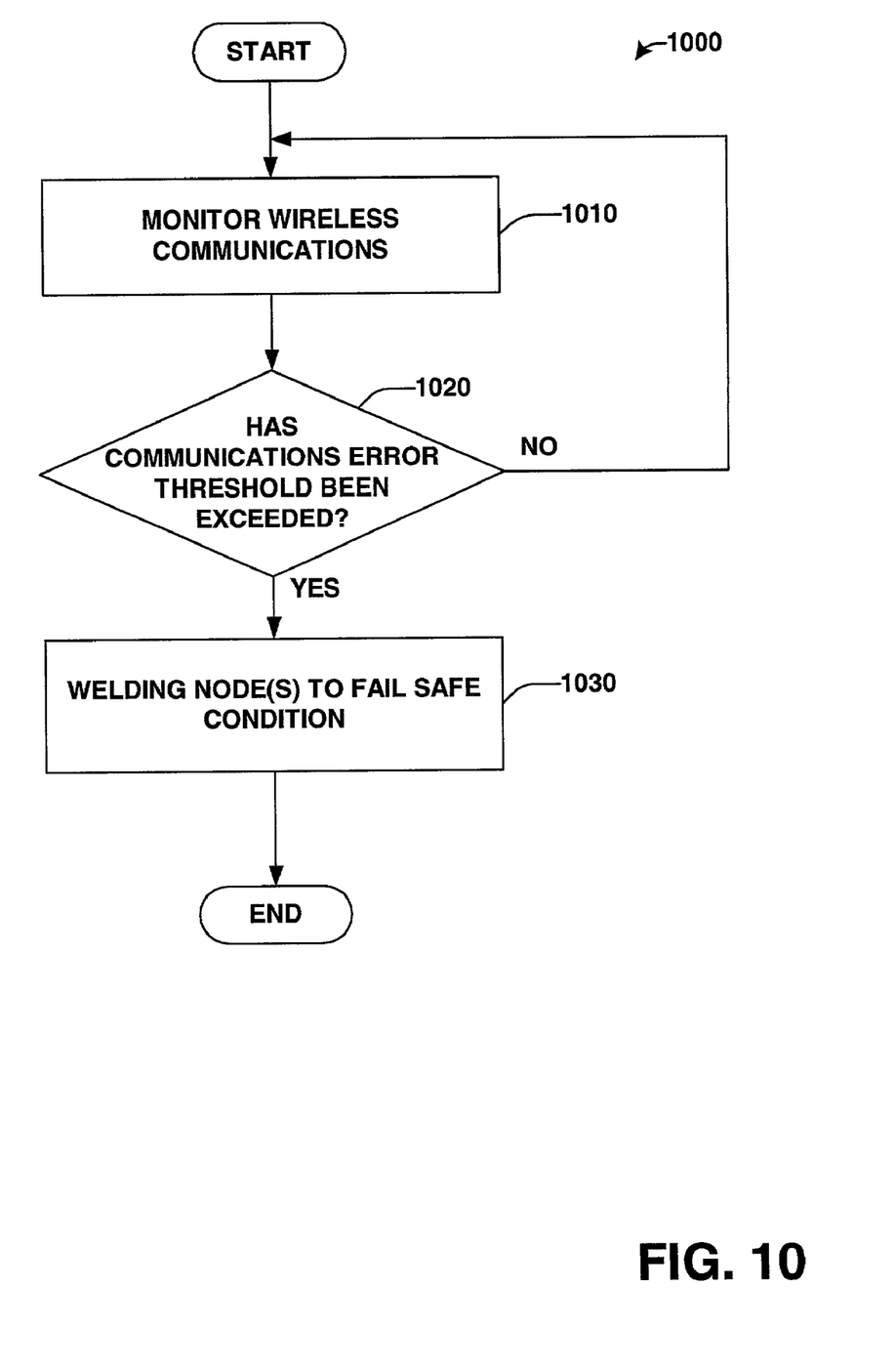
FIG. 10 is a flow chart diagram illustrating a methodology for providing fail safe condition with wireless communication in a welding system in accordance with the present invention.

Turning to FIG. 10, a methodology for providing a fail safe condition with wireless communication in a welding system in accordance with the present invention is illustrated. Beginning at 1010, wireless communications is monitored. At 1020, a determination is made as to whether a communications error threshold has been exceeded. If the determination at 1020 is NO, processing continues at 1010. If the determination at 1020 is YES, at 1030, welding node(s) are placed in a fail safe condition.

What has been described above are various aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A welding system, comprising:
   a first welding cell comprising at least one welding node having a wireless communications interface;
   at least one other welding cell comprising at least one welding node having a wireless communications interface wherein the at least one welding node of the first welding cell and the at least one welding node of the at least one other welding cell communicate wirelessly with each other via a frequency adjusting wireless communication protocol; and
   at least one factory control that retrieves communication error log information from at least one of the first welding cell and the at least one other welding cell and places at least one of the first welding cell and the at least one other welding cell in a fail safe condition if the communication error log information exceeds a threshold.

2. The welding system of claim 1 wherein the at least one welding node of the first welding cell and the at least one welding node of the at least one other welding cell communicate wirelessly utilizing one of Bluetooth, ConnexRF and point-to-multipoint short-range RF (radio frequency) format.

3. The welding system of claim 1 wherein the at least one welding node of the first welding cell and the at least one welding node of the at least one other welding cell communicate wirelessly utilizing Bluetooth format via at least one of RFComm, OBEX, Service Discovery Protocol, and logical link control and adaptation protocols.

4. The welding system of claim 1 wherein the at least one welding node of the first welding cell and the at least one welding node of the at least one other welding cell are one of a power source, a gas controller, a wire feeder, a contact tip, a dresser, a gas mixer, a gas sneezer, a gas controller, a clamp actuator, a robot arm/beam/torch manipulator, a laser seam tracker, a wire drive and gun, a water cooler, a welder, a part handler, a torch travel and a user control.

5. The welding system of claim 1 wherein the at least one welding node of the first welding cell and the at least one welding note of the at least one other welding cell communicate wirelessly utilizing a format that provides frequency spread spectrum hopping or direct sequence spread spectrum.

6. The welding system of claim 1 wherein information communicate between the at least one welding node of the first welding cell and the at least one welding node of the at least one other welding cell is at least one of weld procedures, parameters, diagnostic information, error logs, machine metrics, system metrics, specifications, manuals, machine enhancements, files for specific user application and sensor feedback.

7. The welding system of claim 1, the at least one factory control transmits at least one of a time of a weld procedure and a change of a weld procedure wirelessly to the first welding cell and the at least one other welding cell.

8. The welding system of claim 1, the at least one factory control can retrieve information from the first welding cell and the at least one other welding cell and initiate an action based upon the retrieved information.

9. A method for providing wireless communication in a welding system comprising:
  generating an RF field around at least one welding node;
  generating an RF field around a wireless communications device;
  establishing communication between the wireless communications device and the at least one welding node via a frequency adjusting wireless communication protocol;
  receiving information via the wireless communications device from the at least one welding node;
  transmitting information to the at least one welding node from the wireless communications device;
  determining whether a communications error threshold has been exceeded; and,
  placing the at least one welding node into a fail safe condition if the communications error threshold has been exceeded.

10. The method of claim 9, further comprising: continuing a weld process if a communications error has not been exceeded.

11. A wireless system for communicating welding information, comprising:
  a first welding node having a wireless communications interface adapted to communicate via a wireless signal utilizing a frequency adjusting wireless communication protocol;
  at least one other welding node having a wireless communications interface adapted for wireless communication with the first welding node via the wireless signal; and
  a server having a wireless communications interface that maintains information associated with the first welding node and the at least one other welding node and places at least one of the first welding node and the at least one other welding node in a fail safe condition if the maintained information indicates a communication error threshold has been exceeded.

12. The wireless system of claim 11, the maintained information is at least one of weld procedures, parameters, diagnostic information, error logs, machine metrics, system metrics, specifications, manuals, machine enhancements, files for specific user application and sensor feedback.

13. The wireless system of claim 11, the server is a repository of weld procedures for a factory.

14. A welding system, comprising:
  means for a first welding node to wirelessly communicate utilizing a frequency adjusting wireless communication protocol;
  means for an Nth welding node to wirelessly communicate information with the first welding node wherein the information includes at least one of weld procedures, parameters, diagnostic information, error logs, machine metrics, system metrics, specifications, manuals, machine enhancements, files for specific user application and sensor feedback;
  means for monitoring a communications error threshold; and
  means for placing at least one of the first welding node and the Nth welding node in a fail safe condition if the communications error threshold is exceeded.

15. A method for providing wireless communications in a welding system comprising:
  generating an RF field around a first welding node;
  generating an RF field around at least one other welding node;
  establishing communication between the first welding node and the at least one other welding node via a frequency adjusting wireless communication protocol; wherein
  the at least one other welding node receives information wirelessly from the first welding node; and,
  the at least one other welding node transmits information wirelessly to the first welding node; and
  storing information communicated between the first welding node and the at least one other welding node in a central location;
  determining if a communications error threshold has been exceeded; and,
  placing the at least a first welding node into a fail safe condition if the communications error threshold has been exceeded.

* * * * *